United States Patent
Kruglick (10) Patent No.: US 9,710,291 B2
(45) Date of Patent: Jul. 18, 2017

(54) PROCESSOR-OPTIMIZED LIBRARY LOADING FOR VIRTUAL MACHINES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 222 days.

(21) Appl. No.: 14/241,052

(22) PCT Filed: Jun. 19, 2013

(86) PCT No.: PCT/US2013/046584
§ 371 (c)(1),
(2) Date: Aug. 7, 2014

(87) PCT Pub. No.: WO2014/204453
PCT Pub. Date: Dec. 24, 2014

(65) Prior Publication Data
US 2015/0254084 A1    Sep. 10, 2015

(51) Int. Cl.
*G06F 9/455* (2006.01)
*G06F 9/445* (2006.01)

(52) U.S. Cl.
CPC ...... *G06F 9/44521* (2013.01); *G06F 9/45558* (2013.01); *G06F 2009/4557* (2013.01)

(58) Field of Classification Search
CPC .......... G06F 8/60; G06F 9/44521; G06F 8/76; G06F 9/44552; G06F 9/4856; G06F 9/5077; H04L 29/06
See application file for complete search history.

(56) References Cited

U.S. PATENT DOCUMENTS

| | | | |
|---|---|---|---|
| 5,634,070 A | 5/1997 | Robinson | |
| 5,974,470 A * | 10/1999 | Hammond | G06F 9/44521 707/999.202 |
| 6,442,752 B1 * | 8/2002 | Jennings | G06F 9/44521 717/162 |
| 6,671,713 B2 * | 12/2003 | Northrup | G06F 9/54 709/203 |

(Continued)

FOREIGN PATENT DOCUMENTS

WO    WO 0062160 A2 * 10/2000 ......... G06F 9/44521

OTHER PUBLICATIONS

"A supercomputer at your fingertips," PiCloud, accessed at http://web.archive.org/web/20130603052613/http://www.picloud.com/, accessed on Jan. 21, 2014, pp. 1-3.

(Continued)

*Primary Examiner* — Lewis A Bullock, Jr.
*Assistant Examiner* — Gilles Kepnang
(74) *Attorney, Agent, or Firm* — Turk IP Law, LLC (57) ABSTRACT

Technologies are provided for loading processor-optimized library modules into virtual machines. In some examples, when a virtual machine is to be executed on a processor, the processor may be identified based on one or more processor characteristics. After the processor is identified, one or more library modules loaded into the virtual machine may be replaced with other library modules optimized for the identified processor.

11 Claims, 6 Drawing Sheets

(56) References Cited

U.S. PATENT DOCUMENTS

| | | | | |
|---|---|---|---|---|
| 6,763,327 | B1* | 7/2004 | Songer | G06F 9/45504 703/20 |
| 7,376,945 | B1* | 5/2008 | Kakumani | G06F 8/67 717/135 |
| 8,527,990 | B1* | 9/2013 | Marathe | G06F 9/45558 718/1 |
| 8,555,275 | B1* | 10/2013 | Gokhale | G06F 9/45558 718/1 |
| 9,223,598 | B1* | 12/2015 | Koryakina | G06F 9/455 |
| 2002/0103779 | A1* | 8/2002 | Ricart | G06F 9/44505 |
| 2003/0079213 | A1 | 4/2003 | Cabillic et al. | |
| 2003/0187915 | A1* | 10/2003 | Sun | H04L 29/06 709/201 |
| 2007/0271561 | A1* | 11/2007 | Winner | G06F 8/65 718/1 |
| 2007/0294578 | A1* | 12/2007 | Qiao | G06F 11/203 714/17 |
| 2009/0070760 | A1 | 3/2009 | Khatri et al. | |
| 2009/0094445 | A1* | 4/2009 | Brandyberry | G06F 9/5077 712/233 |
| 2009/0241110 | A1 | 9/2009 | Heo et al. | |
| 2010/0011370 | A1* | 1/2010 | Kubo | G06F 8/60 718/104 |
| 2010/0138828 | A1 | 6/2010 | Hanquez et al. | |
| 2010/0199104 | A1 | 8/2010 | Van Rijnswou | |
| 2010/0313189 | A1 | 12/2010 | Beretta et al. | |
| 2010/0332629 | A1* | 12/2010 | Cotugno | G06F 9/5072 709/221 |
| 2011/0179176 | A1 | 7/2011 | Ravichandran et al. | |
| 2011/0231440 | A1* | 9/2011 | Vlaovic | G06F 8/71 707/769 |
| 2011/0265072 | A1* | 10/2011 | Matthew | G06F 8/65 717/169 |
| 2012/0011499 | A1 | 1/2012 | Conover et al. | |
| 2012/0054367 | A1 | 3/2012 | Ramakrishnan et al. | |
| 2012/0089980 | A1 | 4/2012 | Sharp et al. | |
| 2012/0227058 | A1* | 9/2012 | Hunt | G06F 9/45558 719/318 |
| 2012/0233612 | A1* | 9/2012 | Beckett | G06F 9/45533 718/1 |
| 2013/0332928 | A1* | 12/2013 | Ishizawa | G06F 9/44 718/100 |
| 2013/0346669 | A1* | 12/2013 | Nightingale | G06F 8/65 711/103 |
| 2014/0101649 | A1* | 4/2014 | Kamble | G06F 9/45558 717/170 |
| 2014/0282462 | A1* | 9/2014 | Peckham | G06F 9/46 717/168 |

OTHER PUBLICATIONS

"Amazon EC2 Instances," Amazon Web Services, accessed at http://web.archive.org/web/20130613064144/http://aws.amazon.com/ec2/instance-types/, accessed on Jan. 21, 2014, pp. 1-5.
"Idea to Entrepreneurship," Nimbix, pp. 15 (Mar. 10, 2012).
"Intel® Math Kernel Library (Intel® MKL) 11.0," Intel, accessed at http://web.archive.org/web/20130608220316/http://software.intel.com/en-us/intel-mkl/, accessed on Jan. 21, 2014, pp. 1-8.
"Intel® Xeon® Processor E5-2665 (20M Cache, 2.40 GHz, 8.00 GT/s Intel® QPI)," Intel, accessed at http://ark.intel.com/products/64597/Intel-Xeon-Processor-E5-2665-20M-Cache-2_40-GHz-8_00-GTs-Intel-QPI, accessed on Jan. 21, 2014, pp. 1-3.
"Intel® Xeon® Processor X5550 (8M Cache, 2.66 GHz, 6.40 GT/s Intel® QPI)," Intel, accessed at http://ark.intel.com/products/37106/Intel-Xeon-Processor-X5550-8M-Cache-2_66-GHz-6_40-GTs-Intel-QPI, accessed on Jan. 21, 2014, pp. 1-3.
"LAPACK—Linear Algebra PACKage," accessed at http://web.archive.org/web/20130603060544/http://www.netlib.org/lapack/, accessed on Jan. 21, 2014, pp. 1-8.
"VMInjector—DLL Injection tool to unlock guest VMs," Secforce, accessed at http://web.archive.org/web/20130526060836/http://www.secforce.com/blog/2012/11/vminjector/, accessed on Jan. 21, 2014, pp. 1-2.
Ando, R., et al., "Inter-domain Communication Protocol for Real-time File Access Monitor of Virtual Machine," Journal of Wireless Mobile Networks, Ubiquitous Computing, and Dependable Applications, vol. 3, No. 1/2, pp. 120-137.
Aroca, R.V., and Gonçalves, L.M.G., "Towards Green Data Centers: A Comparison of X86 and ARM Architectures Power Efficiency," Journal of Parallel and Distributed Computing, vol. 72, Issue 12, pp. 1770-1780 (2012).
Chen, Y-K., et al., "Implementation of H.264 encoder and decoder on personal computers," J Vis. Commun. Image Represent., vol. 17, pp. 509-532, Elsevier Inc. (2006).
Chen, Z., "Fast integer-pel and fractional-pel motion estimation for H.264/AVC," Journal of Visual Communication and Image Representation, vol. 17, Issue 2, pp. 264-290 (2006).
Chun, B-G., et al., "An Energy Case for Hybrid Datacenters," ACM SIGOPS Operating Systems Review, vol. 44, pp. 76-80 (2010).
Hameed, R., et al. "Understanding Sources of Inefficiency in General-purpose Chips," Communications of the ACM, vol. 54, No. 10, pp. 85-93 (2010).
Iverson, V., et al., "Real-time H.264/AVC Codec on Intel architectures," International Conference on Image Processing ICIP'04, vol. 2, pp. 757-760 (2004).
Kim, S., et al., "Group-Based Memory Deduplication for Virtualized Clouds" Proceedings of the 2011 international conference on Parallel Processing, vol. 2, pp. 387-397 (2011).
Nasika, R., and Dasgupta, P., "Transparent Migration of Distributed Communicating Processes," pp. 7 (2000).
Ou, Z., et al., "Exploiting Hardware Heterogeneity Within the Same Instance Type of Amazon EC2," Proceedings of the 4th USENIX Conference on Hot Topics in Cloud Computing, pp. 1-5 (2012) https://www.usenix.org/system/files/conference/hotcloud12/hotcloud12-final40.pdf.
Shimpi, A.L., "Intel Plans on Bringing Atom to Servers in 2012, 20W SNB Xeons in 2011," AnandTech, accessed at http://web.archive.org/web/20130602024900/http://www.anandtech.com/show/4222/intel-plans-on-bringing-atom-to-servers-in-2012-20w-snb-xeons-in-2011, Mar. 15, 2011, pp. 1-5.
Staley, A., "When EC2 Hardware Changes Underneath You . . . ," PiCloud, accessed at http://web.archive.org/web/20130430102205/http://blog.picloud.com/2013/01/08/when-ec2-hardware-changes-underneath-you/, Jan. 8, 2013, pp. 1-4.
Xu, J., "Efficient Fast ME Predictions and Early-termination Strategy Based on H.264 Statistical Characters," Proceedings of the 2003 Joint Conference of the Fourth International Conference on Information, Communications and Signal Processing, 2003 and Fourth Pacific Rim Conference on Multimedia, vol. 1, pp. 218-222 (2003).
Yin, P., et al., "Fast Mode Decision and Motion Estimation for JVT/H.264," In 2003 International Conference on Image Processing, vol. 3, III-853-6 vol. 2, (2003).
Zhang, S., et al., "Processes Migration through Virtualization in a Computing Community," pp. 8 (2001).
International Search Report with Written Opinion for International Application No. PCT/US2013/046584 mailed on Dec. 23, 2013.
Mora, "Understanding the Bulldozer Architecture through the LINPACK Benchmark," Recorded at the HPC Advisory Council European Workshop at ISC'12 in Hamburg, Published Jun. 24, 2012. Retrieved from URL <<http://www.youtube.com/watch?v=myIUMnRtPnM&list=PLF6354E41700BA2FC&index=2>> on Jan. 20, 2014.
Conover et al., "Code Injection From the Hypervisor:Removing the need for in-guest agents," Jul. 2009. Retrieved from URL <<http://www.blackhat.com/presentations/bh-usa-09/CONOVER/BHUSA09-Conover-SADEintoVM-SLIDES.pdf>>.

\* cited by examiner

PROCESSOR-OPTIMIZED LIBRARY LOADING FOR VIRTUAL MACHINES

CROSS-REFERENCE TO RELATED APPLICATION

This Application is the U.S. National Stage filing under 35 U.S.C. §371 of International Application No. PCT/US13/46584 filed on Jun. 19, 2013. The International application is hereby incorporated by reference in its entirety.

BACKGROUND

Unless otherwise indicated herein, the materials described in this section are not prior art to the claims in this application and are not admitted to be prior art by inclusion in this section.

Cloud-based systems, used in many web-enabled applications, continue to grow in popularity. The datacenters that underpin these cloud-based systems may attempt to provide hardware-agnostic or platform-agnostic services, virtual machines, or instances for flexibility and ease of migration. However, the actual hardware in many datacenters may vary. For example, a datacenter may include processors from different manufacturers, with different processor architectures, different processor types, and/or different processor models.

There are challenges in trying to realize virtualized and load balanced cloud computation. One of the more prominent challenges is that for many important and demanding applications that make intensive use of computing resources, true performance optimization may not just be instruction set reliant but may actually depend on optimization to a particular processor make and model. However, datacenters may not allow users to select their favorite processor for practical reasons. Different processors may provide different amounts of real compute power for the same nominal instance type, so most users may simply select the "best" processor. Another issue is that, users used to picking their favorite processor type may become attached to those processors with processor-specific code making it difficult for datacenters to upgrade to stay competitive (and making it difficult for newer datacenters to attract customers to newer hardware).

SUMMARY

The present disclosure generally describes techniques for loading processor-optimized library modules into virtual machines.

According to some examples, a method is provided for loading processor-optimized library modules into virtual machines. The method may include detecting a first library module loaded into a virtual machine (VM) to be executed on a first processor, determining a processor characteristic associated with the first processor, selecting a second library module based on the first library module and the determined processor characteristic, and loading the second library module into the VM to replace the first library module.

According to other examples, a virtual machine manager (VMM) is provided to load processor-optimized library modules into virtual machines. The VMM may include a library detection module, a processing module, and a library injection module. The library detection module may be configured to detect a first library module loaded into a virtual machine (VM) to be executed on a first processor. The processing module may be configured to determine a processor characteristic associated with the first processor and select a second library module based on the first library module and the determined processor characteristic. The library injection module may be configured to load the second library module into the VM to replace the first library module.

According to further examples, a cloud-based datacenter is provided to load processor-optimized library modules into virtual machines. The datacenter may include at least one virtual machine (VM) operable to be executed on one or more physical machines and a datacenter controller. The datacenter controller may be configured to detect a first library module loaded into the at least one VM to be executed on a first physical machine, determine a processor characteristic associated with the first physical machine, select a second library module based on the first library module and the determined processor characteristic, and load the second library module into the VM to replace the first library module.

According to yet further examples, a computer readable medium may store instructions for loading processor-optimized library modules into virtual machines. The instructions may include detecting a first library module loaded into a virtual machine (VM) to be executed on a first processor, determining a processor characteristic associated with the first processor, selecting a second library module based on the first library module and the determined processor characteristic, and loading the second library module into the VM to replace the first library module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to loading processor-optimized library modules into virtual machines.

Briefly stated, technologies are generally described for loading processor-optimized library modules into virtual machines. In some examples, when a virtual machine is to be executed on a processor, the processor may be identified based on one or more processor characteristics. After the processor is identified, one or more library modules loaded in the virtual machine may be replaced with other library modules optimized for the identified processor.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. An example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with configurations where each service provider would execute their applications and have their users access those applications on the retail service's own servers physically located on retail service premises. One result of the networked approach described herein is that customers like the retail service may move their hosted services/applications from one datacenter to another without the users noticing a difference.

Figure 1:
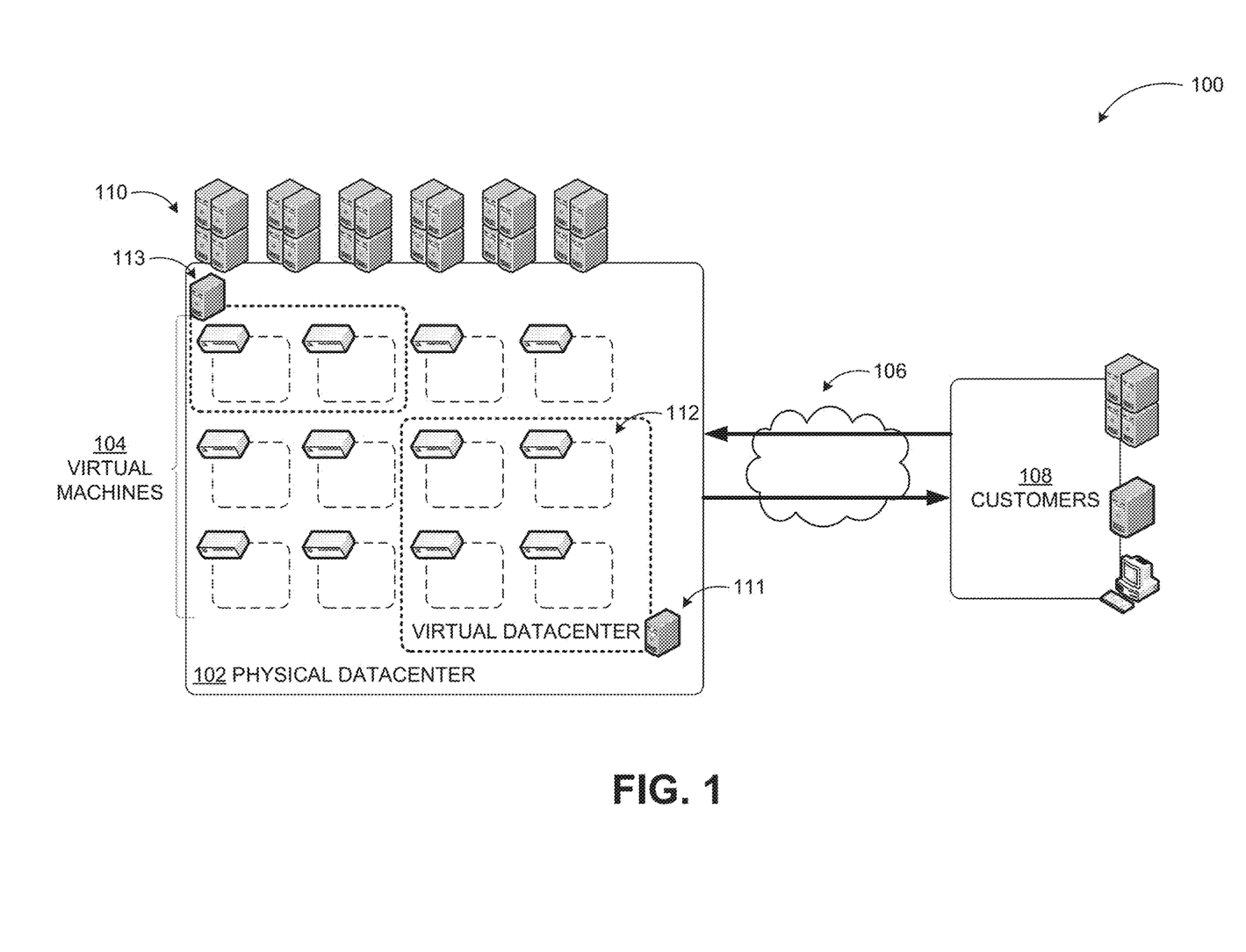
FIG. 1 illustrates an example datacenter-based system where loading of processor-optimized library modules into virtual machines may be implemented.

FIG. 1 illustrates an example datacenter-based system where loading of processor-optimized library modules into virtual machines may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

According to some examples, a virtual machine may be provided with a processor-model-specific computation library, which may be replaced based on a processor the virtual machine is being executed on. In particular, tagged optimized dynamic link libraries (DLLs) may be placed in a virtual machine and then the DLLs recognized and injected with replacements during migration so that as the VM migrates from one processor model to another processor model, the DLL is also changed between the matching processors.

Figure 2:
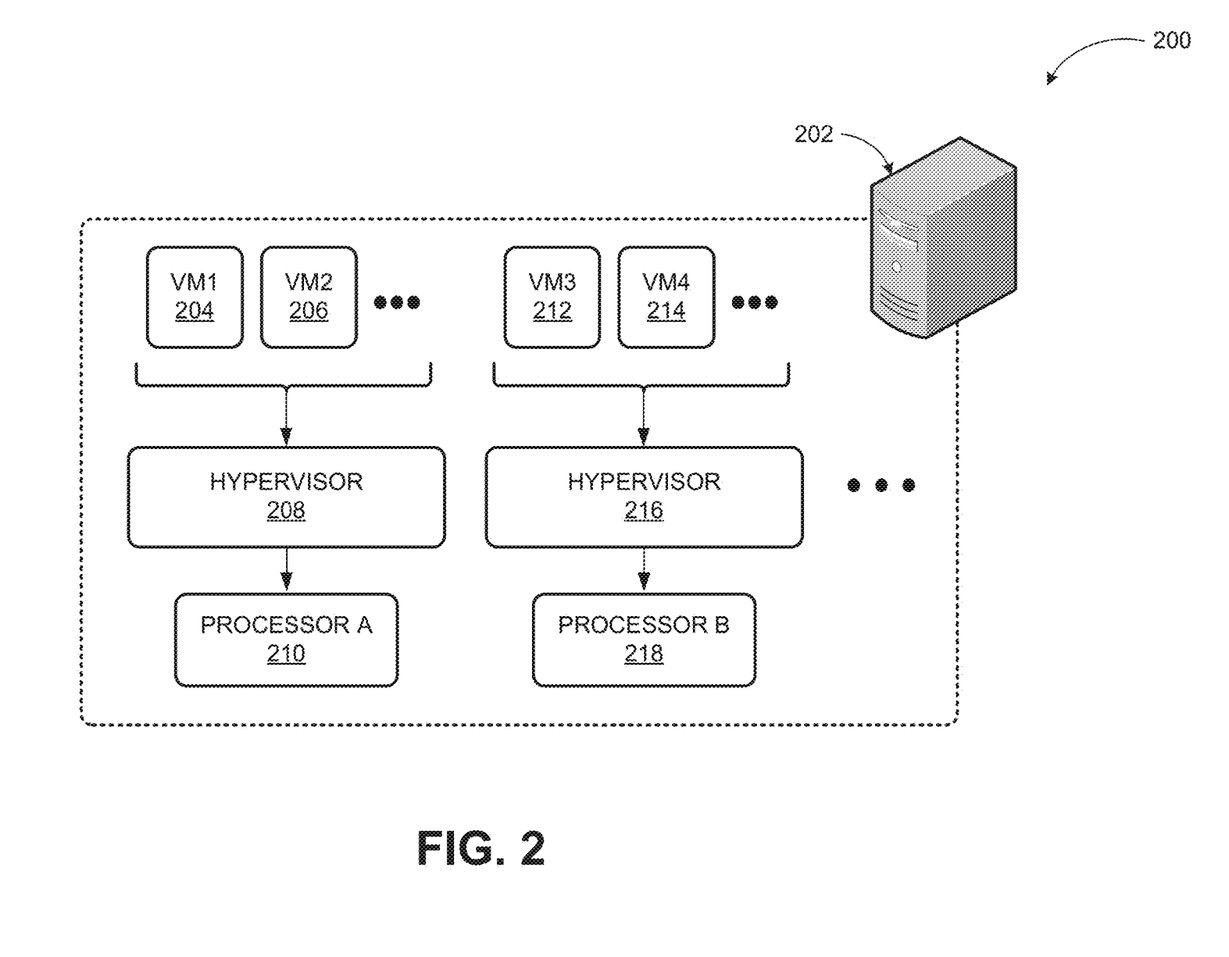
FIG. 2 illustrates an example datacenter-based system having multiple processors.

FIG. 2 illustrates an example datacenter-based system having multiple processors, arranged in accordance with at least some embodiments described herein.

As shown in a diagram 200, a physical server 202 (similar to the physical servers 111 and 113 in FIG. 1) may include a number of physical processors. For example, the physical server 202 may include a processor A 210, a processor B 218, and potentially other processors (not shown). Each processor may have an associated hypervisor or virtual machine manager that manages the virtual machines or instances that are executed on the processor. For example, a first hypervisor 208 may be associated with the processor A 210. The first hypervisor 208 may, in turn, manage virtual machines VM1 204, VM2 206, and potentially other virtual machines (not shown), each of which is configured to execute on the processor A 210. Similarly, a second hypervisor 216 may be associated with the processor B 218 and may manage virtual machines VM3 212, VM4 214, and potentially other virtual machines (not shown) configured to execute on the processor B 218.

As mentioned above, the hardware in datacenters may vary, and a given datacenter may include different kinds or types of processors. For example, the processor A 210 may differ from the processor B 218 in manufacturer, processor architecture, processor type, processor model, or any other processor characteristic. While the datacenter with the physical server 202 may attempt to maintain consistent performance across different hardware, implementation differences across different processors may make this difficult. For example, a particular model of processor may support a particular instruction set, while another model of processor may not, even if the two processor models have the same manufacturer, architecture, and/or type. Nevertheless, a datacenter may migrate instances or virtual machines between processors having relatively similar performance, even if the processors actually differ significantly. For example, if the processor A 210 and the processor B 218 have relatively similar performance, the virtual machine VM1 204 may be migrated between the processor A 210 and the processor B 218 automatically and transparently for, e.g., load distribution purposes.

At the same time, cloud developers may wish to optimize the performance of their applications or virtual machines in the datacenter environment, even to the point of taking advantage of hardware-specific implementation details. For example, a developer may include particular instructions or software library modules (also known as "dynamic linked libraries" or DLLs) optimized for a particular type or model of processor in a virtual machine in order to increase performance. If the virtual machine is executed on the corresponding type or model of processor, then the optimized library modules may allow increased performance. However, if the virtual machine is then migrated to another processor of a different type or model, then performance may be lost, and the virtual machine may even fail if the other processor does not support the particular instructions or library modules. As a result, the developer may have no choice other than to either accept the performance degradation or shut down and restart the virtual machine, hopefully on a more suitable processor. In the latter case, the developer may sometimes end up wasting already-paid-for time on the original processor.

To address this issue, techniques and systems for detecting and replacing DLLs in a virtual machine to be migrated with DLLs optimized for the destination hardware may be provided, as described below.

Figure 3:
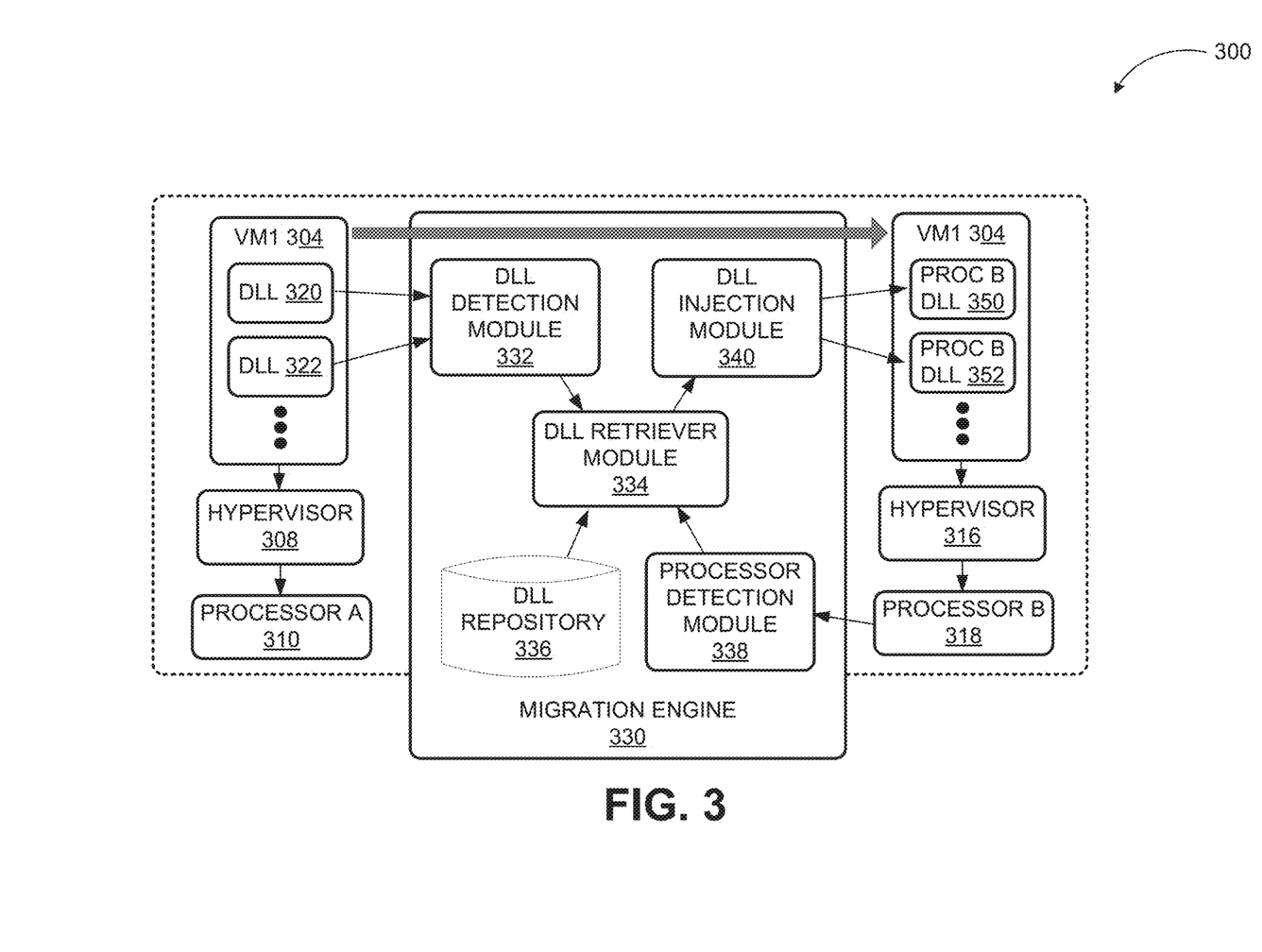
FIG. 3 illustrates an example migration engine configured to load processor-optimized library modules into virtual machines.

FIG. 3 illustrates an example migration engine configured to load processor-optimized library modules into virtual machines, arranged in accordance with at least some embodiments described herein.

According to a diagram 300, a virtual machine VM1 304 (similar to the VM1 204) may be configured to execute on a processor A 310 (similar to the processor A 210) and to be managed by a first hypervisor 308 (similar to the first hypervisor 208). The virtual machine VM1 304 may be configured to operate using one or more library modules or dynamic linked libraries (DLLs) to perform particular functions, such as data manipulations or processing. For example, the virtual machine VM1 may operate using a DLL 320, a DLL 322, and other DLLs as appropriate. In some embodiments, the DLLs may be configured to provide video, image, and/or file compression functionality. The DLLs may also be configured to provide matrix processing functionality and/or real-time analytics processing.

At some point, the virtual machine VM1 304 may be migrated to a different processor. For example, the virtual machine VM1 304 may be migrated to another processor on the same physical server, on another physical server at the datacenter, or even to another datacenter. In the example shown in the diagram 300, the virtual machine VM1 304 may be migrated to a processor B 318 (similar to the processor B 218) and managed by a hypervisor 316 (similar to the hypervisor 216).

In some embodiments, a migration engine 330 may control the migration of the virtual machine VM1 304 from the processor A 310 to the processor B 318. The migration engine 330 may include components configured to detect DLLs in a virtual machine to be migrated, search for equivalent DLLs optimized for the destination processor, and replace the detected DLLs with the equivalent DLLs. For example, a DLL detection module 332 in the migration engine 330 may be configured to detect the DLLs 320 and 322 in the virtual machine VM1 304 and send information about the detected DLLs 320 and 322 to a DLL retriever module 334. In some embodiments, the DLLs 320 and 322 may each be tagged with identification data that allows the DLL detection module 332 to identify the particular DLL and/or its function. The identification data may include an identification string and/or a deduplication hash block (i.e., a data block that, when subject to a hashing procedure, results in a known hash signature), and may contain information about the function of the DLL and/or hardware it is optimized for. In some embodiments, DLL tag information may be present in the memory of the virtual machine VM1 304, and the DLL detection module 332 may search the virtual machine memory to identify the DLLs.

A processor detection module 338 may be configured to detect one or more characteristics associated with the destination processor B 318, such as processor type, model number, serial number, architecture, or any other suitable processor characteristic. The processor detection module 338 may then send the detected processor characteristic(s) to the DLL retriever module 334.

The DLL retriever module 334 may then search for DLLs equivalent to the detected DLLs 320 and 322 and optimized for the destination processor B 318. For example, the DLL retriever module 334 may search for equivalent DLLs in a DLL repository 336. The DLL repository 336 may store a number of different DLLs, some having equivalent function but written and optimized for different hardware configurations. In some embodiments, the different DLLs in the DLL repository 336 may be provided by processor manufacturers and/or service providers dedicated to providing hardware-optimized DLLs to datacenters or other cloud providers. Each DLL in the DLL repository 336 may be tagged with identification information (e.g., similar to the DLLs 320 and 322 as described above). The DLL retriever module 334 may then search the DLL repository 336 by looking for DLLs tagged with identification information that corresponds to those of the DLLs 320 and 322.

After finding or identifying equivalent DLLs (if any) in the DLL repository 336, the DLL retriever module 334 may then provide the equivalent DLLs to a DLL injection module 340 for injection into the virtual machine to be migrated. For example, the DLL retriever module 334 may find a DLL 350 equivalent to the DLL 320 and optimized for the processor B 318 and a DLL 352 equivalent to the DLL 322 and optimized for the processor B 318. The DLL retriever module 334 may then provide the DLLs 350 and 352 to the DLL injection module 340, which may, in turn, inject the DLLs 350 and 352 into the virtual machine VM1 304 being migrated. The DLL injection module 340 may inject the DLLs 350 and 352 into the virtual machine VM1 304 to replace the DLLs 320 and 322 while the virtual machine VM1 304 is being migrated to the processor B 318. Before the DLLs 320 and 322 are replaced, the DLL injection module 340 may be configured to determine if any processes in the virtual machine VM1 304 are currently using either the DLL 320 or the DLL 322. In response to determining that process(es) are using the DLL 320 or DLL 322, the DLL injection module may wait for the process(es) to complete before replacing the DLLs 320/322 with the DLLs 350/352.

In some embodiments, the DLL injection module 340 may be configured to inject DLLs into a virtual machine when the virtual machine is being started up on a processor (i.e., not being migrated or transferred from one processor to another). The DLL injection module 340 may also be configured to inject DLLs into a virtual machine as the virtual machine is shutting down. For example, suppose the virtual machine VM1 304 is being transferred from a development environment to a production environment (i.e., actually serving customers). In the development environment, the virtual machine VM1 304 may be using general-purpose DLLs that may not be specifically optimized for any particular hardware or processor. In this case, the DLL injection module 340 may replace the general-purpose DLLs with processor-optimized DLLs when the virtual machine VM1 304 shuts down in the development environment. As a result, the virtual machine VM1 304 can be started up in the production environment already having the appropriate processor-optimized DLLs.

Figure 4:
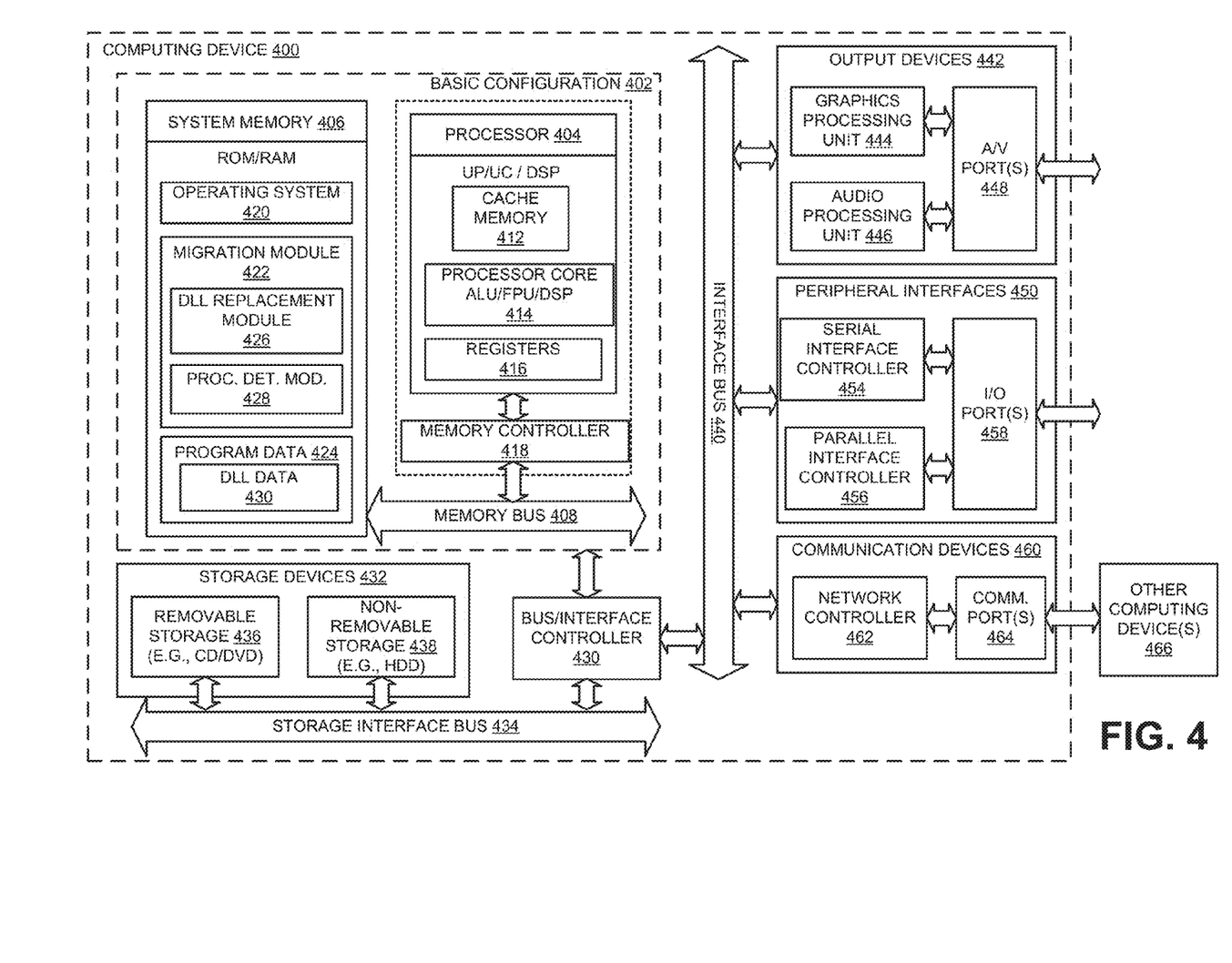
FIG. 4 illustrates a general purpose computing device, which may be used to provide loading of processor-optimized library modules into virtual machines.

FIG. 4 illustrates a general purpose computing device, which may be used to provide loading of processor-optimized library modules into virtual machines, arranged in accordance with at least some embodiments described herein.

For example, the computing device 400 may be used to provide loading of processor-optimized library modules into virtual machines as described herein. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one or more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a migration module 422, and program data 424. The migration module 422 may include a DLL replacement module 426 and a processor detection module 428 to provide loading of processor-optimized library modules as described herein. The program data 424 may include, among other data, DLL data 431 or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage devices and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 442, one or more peripheral interfaces 450, and one or more communication devices 460) to the basic configuration 402 via the bus/interface controller 430. Some of the example output devices 442 include a graphics processing unit 444 and an audio processing unit 446, which may be configured to communicate to various external devices such as a display or speakers via one or more A/V ports 448. One or more example peripheral interfaces 450 may include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 460 includes a network controller 462, which may be arranged to facilitate communications with one or more other computing devices 466 over a network communication link via one or more communication ports 464. The one or more other computing devices 466 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods, for instance, processing customization at migration for continuously optimized datacenter video processing. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 5:
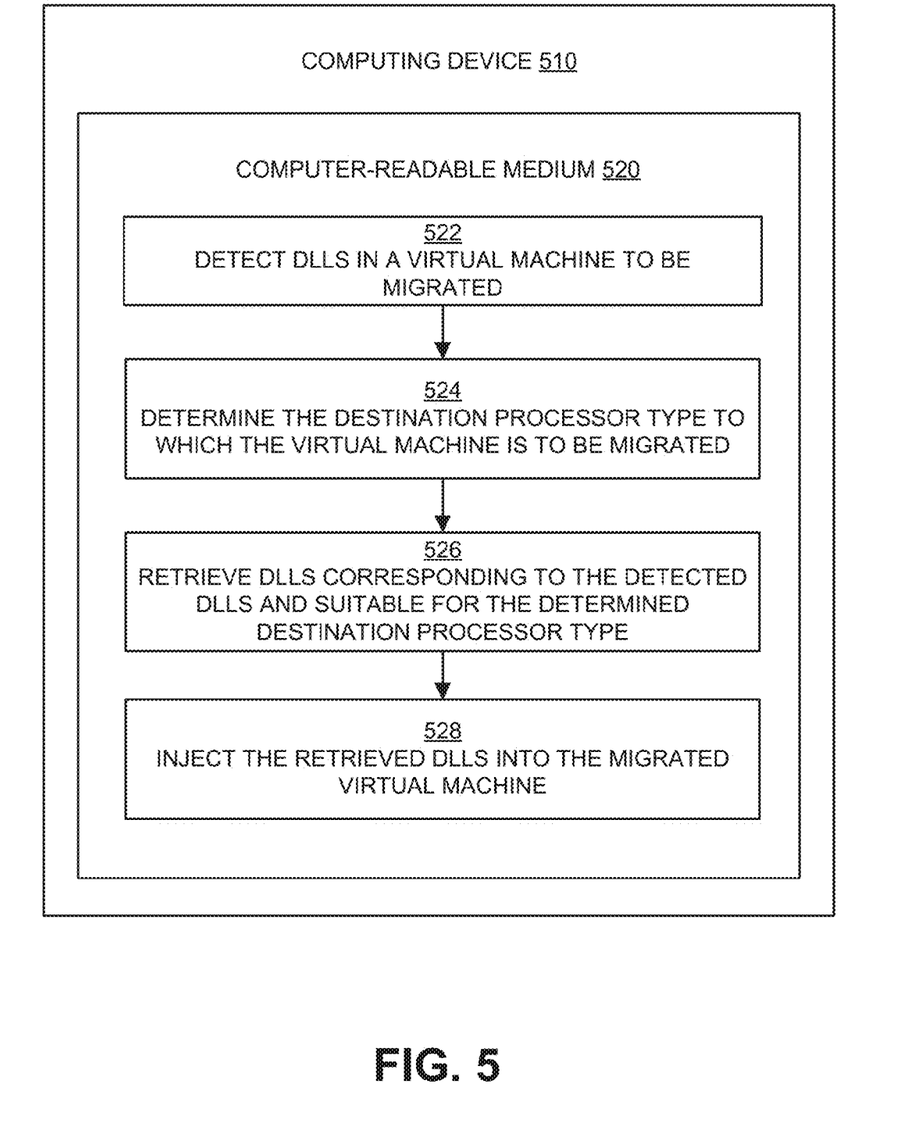
FIG. 5 is a flow diagram illustrating an example method for loading processor-optimized library modules into virtual machines that may be performed by a computing device such as the computing device in FIG. 4.

FIG. 5 is a flow diagram illustrating an example method for loading processor-optimized library modules into virtual machines that may be performed by a computing device such as the computing device in FIG. 4, arranged in accordance with at least some embodiments described herein.

Example methods may include one or more operations, functions or actions as illustrated by one or more of blocks 522, 524, 526, and/or 528, and may in some embodiments be performed by a computing device such as the computing device 400 in FIG. 4. The operations described in the blocks 522-528 may also be stored as computer-executable instructions in a computer-readable medium such as a computer-readable medium 520 of a computing device 510.

An example process for loading processor-optimized library modules into virtual machines may begin with block 522, "DETECT DLLS IN A VIRTUAL MACHINE TO BE MIGRATED", where a DLL detection module (e.g., the DLL detection module 332) may detect DLLs in a virtual machine to be migrated to a different processor, as described above. For example, the DLL detection module 332 may detect the DLLs 320 and 322 in the VM1 304 to be migrated to the processor B 318.

Block 522 may be followed by block 524, "DETERMINE THE DESTINATION PROCESSOR TYPE TO WHICH THE VIRTUAL MACHINE IS TO BE MIGRATED", where a processor detection module (e.g., the processor detection module 338) may identify the type of destination processor to which the virtual machine is to be migrated by detecting one or more processor characteristics, as described above. For example, the processor detection module 338 may detect one or more characteristics associated with the processor B 318, such as processor type, model number, serial number, architecture, or any other suitable processor characteristic.

Block 524 may be followed by block 526, "RETRIEVE DLLS CORRESPONDING TO THE DETECTED DLLS AND SUITABLE FOR THE DETERMINED DESTINATION PROCESSOR TYPE", where a DLL retriever module (e.g., the DLL retriever module 334) searches for and retrieves DLLs suitable for the detected processor type and similar to the detected DLLs in the virtual machine to be migrated, as described above. For example, the DLL retriever module 334 may search for and retrieve DLLs optimized for the processor B 318 and equivalent in function to the DLLs 320 and 322.

Finally, block 526 may be followed by block 528, "INJECT THE RETRIEVED DLLS INTO THE MIGRATED VIRTUAL MACHINE", where a DLL injection module (e.g., the DLL injection module 340) may replace the original DLLs in the virtual machine to be migrated with the DLLs retrieved by the DLL retriever module, as described above. For example, the DLL injection module 340 may replace the DLLs 320 and 322 in the virtual machine VM1 304 with the equivalent DLLs 350 and 352, respectively.

Figure 6:
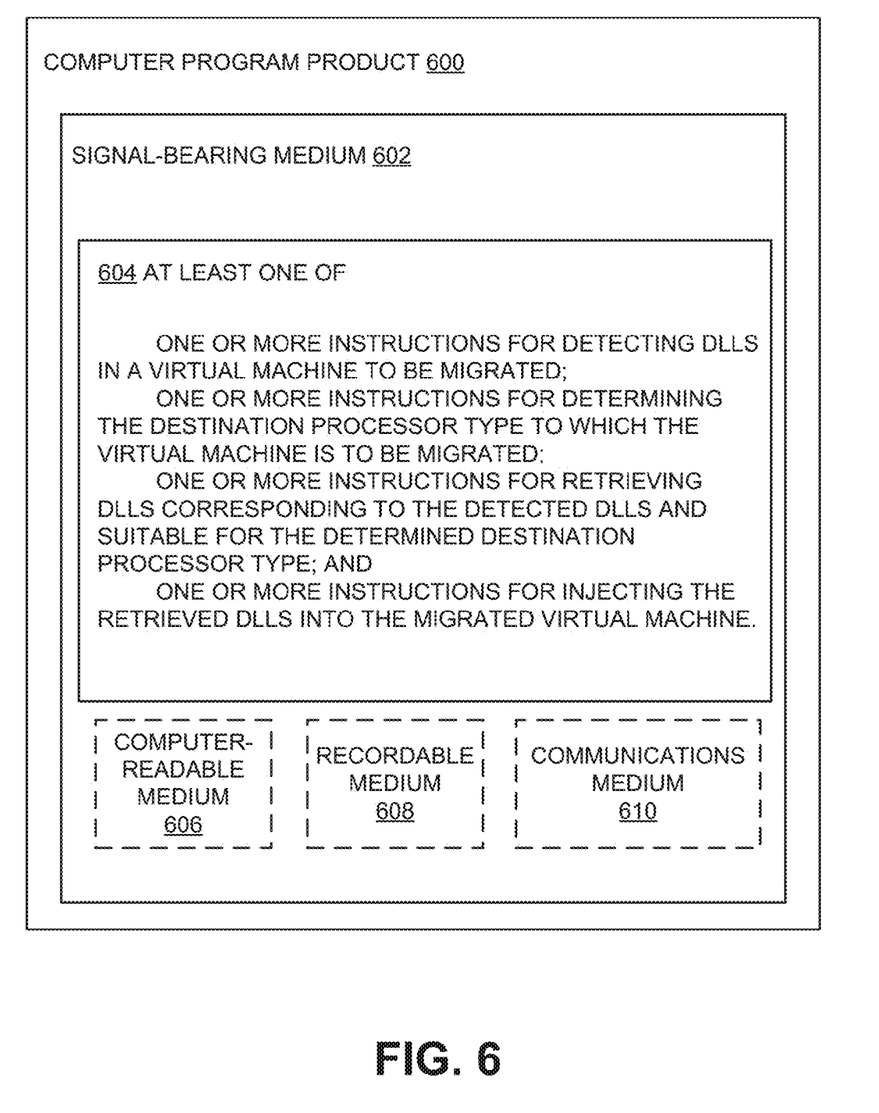
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, the migration module 422 may undertake one or more of the tasks shown in FIG. 6 in response to the instructions 604 conveyed to the processor 404 by the signal bearing medium 602 to perform actions associated with loading processor-optimized library modules into virtual machines as described herein. Some of those instructions may include, for example, detecting dynamic linked libraries (DLLs) in a virtual machine to be migrated, determining the destination processor type to which the virtual machine is to be migrated, retrieving DLLs corresponding to the detected DLLs and suitable for the determined destination processor type, and/or injecting the retrieved DLLs into the migrated virtual machine, according to some embodiments described herein.

In some implementations, the signal bearing medium 602 depicted in FIG. 6 may encompass a computer-readable medium 606, such as, but not limited to, a hard disk drive (HDD), a solid state drive (SSD), a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, the computer program product 600 may be conveyed to one or more modules of the processor 604 by an RF signal bearing medium, where the signal bearing medium 602 is conveyed by the wireless communications medium 610 (e.g., a wireless communications medium conforming with the IEEE 802.11 standard).

According to some examples, a method for loading processor-optimized library modules into virtual machines may include detecting a first library module loaded into a virtual machine (VM) to be executed on a first processor, determining a processor characteristic associated with the first processor, selecting a second library module based on the first library module and the determined processor characteristic, and loading the second library module into the VM to replace the first library module.

According to some embodiments, the second library module may be optimized for the first processor. The method may further include selecting the second library module such that the first library module and the second library module provide substantially similar functionality. The functionality may include video compression, image compression, file compression, matrix processing, and/or real-time analytics processing. The method may further include loading the second library module into the VM in response to migrating the VM from another processor to the first processor, where the first library module is associated with the other processor, starting up the VM on the first processor, and/or shutting down the VM.

According to other embodiments, the method may further include determining whether any processes of the VM are using the first library module, and in response to determining that one or more processes of the VM are using the first library module, waiting for the process(es) to complete before loading the second library module into the VM to replace the first library module. The first library module may be a general-purpose library module. The processor characteristic may include processor type, processor model number, processor serial number, and/or processor architecture. The second library module may include a dynamic linked library (DLL) file.

According to further embodiments, the method may further include selecting the second library module based on identification data, where the second library module is tagged with the identification data. The identification data may include an identification string and/or a deduplication hash block. The method may further include selecting the second library module from a library module repository having multiple library modules. The library modules may be provided by a manufacturer of the processor and/or a library service provider.

According to other examples, a virtual machine manager (VMM) to load processor-optimized library modules into virtual machines at datacenters may include a library detection module, a processing module, and a library injection module. The library detection module may be configured to detect a first library module loaded into a virtual machine (VM) to be executed on a first processor. The processing module may be configured to determine a processor characteristic associated with the first processor and select a second library module based on the first library module and the determined processor characteristic. The library injection module may be configured to load the second library module into the VM to replace the first library module.

According to some embodiments, the second library module may be optimized for the first processor. The first library module and the second library module may provide substantially similar functionality. The functionality may include video compression, image compression, file compression, matrix processing, and/or real-time analytics processing. The library injection module may be further configured to load the second library module into the VM in response to a migration of the VM from another processor to the first processor, where the first library module is associated with the other processor, a start-up process of the VM on the first processor, and/or a shut-down process of the VM.

According to other embodiments, the processing module may be further configured to determine whether any processes of the VM are using the first library module, and in response to determination that one or more processes of the VM are using the first library module, causing the library injection module to wait for the process(es) to complete before loading the second library module into the VM to replace the first library module. The first library module may be a general-purpose library module. The processor characteristic may include processor type, processor model number, processor serial number, and/or processor architecture. The second library module may include a dynamic linked library (DLL) file.

According to further embodiments, the second library module may be tagged with identification data, and the processing module may be further configured to select the second library module based on the identification data. The identification data may include an identification string and/or a deduplication hash block. The VMM may further include a library module repository having multiple library modules, and the processing module may be further configured to select the second library module from the library module repository. The library modules may be provided by a manufacturer of the processor and/or a library service provider.

According to further examples, a cloud-based datacenter configured to load processor-optimized library modules into virtual machines at the datacenter may include at least one virtual machine (VM) operable to be executed on one or more physical machines and a datacenter controller. The datacenter controller may be configured to detect a first library module loaded into the at least one VM to be executed on a first physical machine, determine a processor characteristic associated with the first physical machine, select a second library module based on the first library module and the determined processor characteristic, and load the second library module into the VM to replace the first library module.

According to some embodiments, the second library module may be optimized for the first physical machine. The first library module and the second library module may provide substantially similar functionality. The functionality may include video compression, image compression, file compression, matrix processing, and/or real-time analytics processing. The controller may be further configured to load the second library module into the VM in response to a migration of the VM from another physical machine to the first physical machine, where the first library module is associated with the other physical machine, a start-up process of the VM on the first physical machine, and/or a shut-down process of the VM.

According to other embodiments, the controller may be further configured to determine whether any processes of the VM are using the first library module, and in response to determination that one or more processes of the VM are using the first library module, wait for the process(es) to complete before loading the second library module into the VM to replace the first library module. The first library module may be a general-purpose library module. The processor characteristic may include processor type, processor model number, processor serial number, and/or processor architecture. The second library module may include a dynamic linked library (DLL) file.

According to further embodiments, the second library module may be tagged with identification data, and the controller may be further configured to select the second library module based on the identification data. The identification data may include an identification string and/or a deduplication hash block. The datacenter may further include a library module repository having multiple library modules, and the controller may be further configured to select the second library module from the library module repository. The library modules may be provided by a manufacturer of the processor and/or a library service provider.

According to yet further examples, a computer readable storage medium may store instructions, which when executed on one or more computing devices execute a method for loading processor-optimized library modules into virtual machines. The instructions may include detecting a first library module loaded into a virtual machine (VM) to be executed on a first processor, determining a processor characteristic associated with the first processor, selecting a second library module based on the first library module and the determined processor characteristic, and loading the second library module into the VM to replace the first library module.

According to some embodiments, the second library module may be optimized for the first processor. The instructions may further include selecting the second library module such that the first library module and the second library module provide substantially similar functionality. The functionality may include video compression, image compression, file compression, matrix processing, and/or real-time analytics processing. The instructions may further include loading the second library module into the VM in response to migrating the VM from another processor to the first processor, where the first library module is associated with the other processor, starting up the VM on the first processor, and/or shutting down the VM.

According to other embodiments, the instructions may further include determining whether any processes of the VM are using the first library module, and in response to determining that one or more processes of the VM are using the first library module, waiting for the process(es) to complete before loading the second library module into the VM to replace the first library module. The first library module may be a general-purpose library module. The processor characteristic may include processor type, processor model number, processor serial number, and/or processor architecture. The second library module may include a dynamic linked library (DLL) file.

According to further embodiments, the instructions may further include selecting the second library module based on identification data, where the second library module is tagged with the identification data. The identification data may include an identification string and/or a deduplication hash block. The instructions may further include selecting the second library module from a library module repository having multiple library modules. The library modules may be provided by a manufacturer of the processor and/or a library service provider.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to load processor-optimized library modules into virtual machines, the method comprising:
    searching a memory of a virtual machine (VM) that is executing on a first processor to identify tagged identification data of a first library module loaded into the VM;
    determining a processor characteristic associated with a second processor, wherein the VM is to be migrated from the first processor to the second processor;
    retrieving a second library module compatible with the second processor, based on the first library module and the determined processor characteristic, wherein the second library module has tagged identification data that corresponds to the tagged identification data of the first library module, has similar functionality to the first library module, is incompatible with the first library module, and is optimized for execution on the second processor;
    determining whether any processes of the VM are using the first library module, wherein the processes of the VM are running on the first processor;
    in response to determination that no processes of the VM are using the first library module, performing:
        migrating the VM having the first library module from the first processor to the second processor;
        starting up the migrated VM on the second processor; and
        injecting the second library module into the started-up VM to replace the first library module;
    in response to a determination that one or more processes of the VM are using the first library module, waiting for the one or more processes to complete, and after completion of the one or more processes, performing:
        migrating the VM having the first library module from the first processor to the second processor;
        starting up the migrated VM on the second processor; and
        injecting the second library module into the started-up VM to replace the first library module; and
    executing processes of the VM that use the second library module on the second processor.

2. The method of claim 1, wherein the functionality includes one or more of video compression, image compression, file compression, matrix processing, and real-time analytics processing.

3. The method of claim 1, wherein the first library module is a general-purpose library module.

4. The method of claim 1, wherein the processor characteristic includes one or more of a processor type, a processor model number, a processor serial number, and a processor architecture.

5. The method of claim 1, wherein the second library module includes a dynamic linked library (DLL) file.

6. The method of claim 1, wherein retrieving the second library module further comprises:
    retrieving the second library module from a library module repository having a plurality of library modules.

7. The method of claim 6, wherein the plurality of library modules is provided by one or more of a manufacturer of the first processor and a library service provider.

8. The method of claim 1, wherein the identification data of the first library module and the tabbed identification data of the second library module include one or more of an identification string and a deduplication hash block.

9. A method to load processor-optimized library modules into virtual machines, the method comprising:
- searching a memory of a virtual machine (VM) that is executing on a first processor to identify tagged identification data of a first library module, wherein the first library module is compatible with the first processor, wherein the first library module is loaded into the VM, and wherein the VM is to be migrated from the first processor to a second processor;
- retrieving a second library module compatible with the second processor, wherein the first library module such that the first library module and the second library module have similar functionality and are incompatible with one another, and wherein the second library module has tagged identification data that corresponds to the tagged identification data of the first library module;
- determining whether any processes of the VM are using the first library module, wherein the processes of the VM are running on the first processor;
- in response to a determination that no processes of the VM are using the first library module, performing:
  - migrating the VM having the first library module from the first processor to the second processor;
  - starting up the migrated VM on the second processor; and
  - injecting the second library module into the started-up VM to replace the first library module;
- in response to a determination that one or more processes of the VM are using the first library module, waiting for the one or more processes to complete, and after completion of the one or more processes, performing:
  - migrating the VM having the first library module from the first processor to the second processor;
  - starting up the migrated VM on the second processor; and
  - injecting the second library module into the started-up VM to replace the first library module; and
- executing processes of the VM that use the second library module on the second processor.

10. The method of claim 9, wherein retrieving the second library module further comprises:
- retrieving the second library module from a library module repository having a plurality of library modules.

11. The method of claim 9, wherein retrieving the second library module further comprises:
- retrieving the second library module based on a determined processor characteristic associated with the second processor, wherein the second library module is optimized for execution on the second processor.

* * * * *

UNITED STATES PATENT AND TRADEMARK OFFICE
CERTIFICATE OF CORRECTION

PATENT NO. : 9,710,291 B2
APPLICATION NO. : 14/241052
DATED : July 18, 2017
INVENTOR(S) : Kruglick Page 1 of 3

It is certified that error appears in the above-identified patent and that said Letters Patent is hereby corrected as shown below:

In the Drawings

In Fig. 4, Sheet 4 of 6, delete "UP/UC/ DSP" and insert -- µP/µC/DSP --, therefor. (see attached sheet)

In Fig. 4, Sheet 4 of 6, for Tag "430", Lines 1-2, delete "DLL DATA 430" and insert -- DLL DATA 431 --, therefor. (see attached sheet)

In Fig. 6, Sheet 6 of 6, for Tag "602", Line 1, delete "SIGNAL-BEARING MEDIUM 602" and insert -- SIGNAL BEARING MEDIUM 602 --, therefor. (see attached sheet)

In the Claims

In Column 16, Line 25, in Claim 1, delete "to determination" and insert -- to a determination --, therefor.

In Column 16, Line 64, in Claim 8, delete "the identification" and insert -- the tagged identification --, therefor.

In Column 16, Line 65, in Claim 8, delete "the tabbed identification" and insert -- the tagged identification --, therefor.

In Column 17, Lines 11-12, in Claim 9, delete "library module such that the first library module and the" and insert -- library module and the --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*

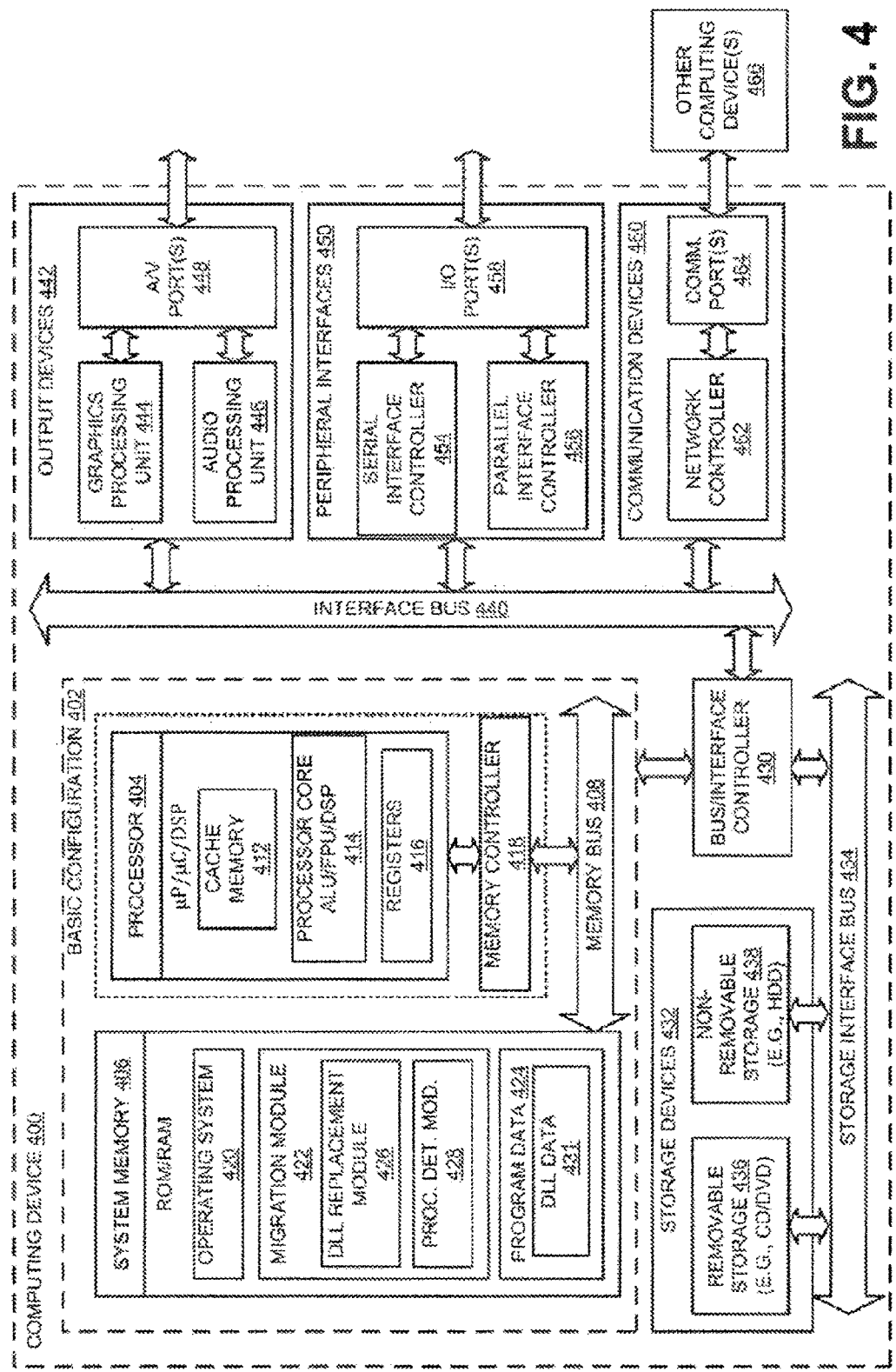

COMPUTER PROGRAM PRODUCT 600

SIGNAL BEARING MEDIUM 602

604 AT LEAST ONE OF:

ONE OR MORE INSTRUCTIONS FOR DETECTING DLLS IN A VIRTUAL MACHINE TO BE MIGRATED;
ONE OR MORE INSTRUCTIONS FOR DETERMINING THE DESTINATION PROCESSOR TYPE TO WHICH THE VIRTUAL MACHINE IS TO BE MIGRATED;
ONE OR MORE INSTRUCTIONS FOR RETRIEVING DLLS CORRESPONDING TO THE DETECTED DLLS AND SUITABLE FOR THE DETERMINED DESTINATION PROCESSOR TYPE; AND
ONE OR MORE INSTRUCTIONS FOR INJECTING THE RETRIEVED DLLS INTO THE MIGRATED VIRTUAL MACHINE.

| COMPUTER-READABLE MEDIUM 606 | RECORDABLE MEDIUM 608 | COMMUNICATIONS MEDIUM 610 |

FIG. 6